United States Patent
Netke et al.

(10) Patent No.: US 10,151,406 B2
(45) Date of Patent: Dec. 11, 2018

(54) CLAMP ASSEMBLY FOR HOLDING VEHICLE PARTS

(71) Applicant: Illinois Tool Works Inc., Glenview, IL (US)

(72) Inventors: Nagesh Arjun Netke, Thane (IN); Ravindra S. Desai, Pune (IN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/920,938

(22) Filed: Mar. 14, 2018

(65) Prior Publication Data
US 2018/0266588 A1    Sep. 20, 2018

(30) Foreign Application Priority Data
Mar. 17, 2017    (IN) .............................. 201710009297

(51) Int. Cl.
| | |
|---|---|
| *F16L 3/02* | (2006.01) |
| *F16L 3/22* | (2006.01) |
| *F16B 7/22* | (2006.01) |
| *F16L 55/02* | (2006.01) |
| *F16L 3/13* | (2006.01) |
| *B60R 16/08* | (2006.01) |
| *F16B 7/04* | (2006.01) |

(52) U.S. Cl.
CPC .............. *F16L 3/222* (2013.01); *B60R 16/08* (2013.01); *F16B 7/0433* (2013.01); *F16B 7/22* (2013.01); *F16L 3/13* (2013.01); *F16L 55/02* (2013.01)

(58) Field of Classification Search
CPC ..... F16L 3/22; F16L 3/13; F16L 55/02; F16B 7/0433; F16B 7/22; B60R 16/08
USPC ................................. 248/68.1, 73; 211/70.4
See application file for complete search history.

(56) References Cited

U.S. PATENT DOCUMENTS

| | | | | |
|---|---|---|---|---|
| 3,188,030 A | * | 6/1965 | Fischer | F16L 3/10 174/156 |
| 3,856,246 A | * | 12/1974 | Sinko | F16L 3/222 138/112 |
| 4,114,241 A | * | 9/1978 | Bisping | F16L 3/13 403/188 |
| 4,199,070 A | * | 4/1980 | Magnussen, Jr. | A47B 63/02 138/112 |
| 4,410,095 A | * | 10/1983 | Dembicks | A47F 5/08 211/70.6 |
| 4,770,297 A | * | 9/1988 | Chang | B65D 85/28 206/379 |

(Continued)

*Primary Examiner* — Anita M King
(74) *Attorney, Agent, or Firm* — Jason P. Gross; The Small Patent Law Group, LLC

(57) ABSTRACT

A clamp assembly includes a body part having a recess of different sizes for holding an elongated structure with different sizes and shapes. A horizontal spaced T-slot is located on a first side surface of the body part at its top and a T-shaped protruding arm is located on a second side surface of the body part at its top. The clamp assembly includes a male locking section with an extended snap arm located on the first side surface of the body part at its bottom and a female locking section with a stopper located on the second side surface of the body part at its bottom. The T-shaped protruding arm is locked into the T-slot and simultaneously the male locking section is locked into the female locking section, such that the clamp assembly is detachably assembled with another clamp assembly.

8 Claims, 6 Drawing Sheets

(56) References Cited

U.S. PATENT DOCUMENTS 7,828,251 B2 * 11/2010 Tollefson .................. E04B 5/48
 248/49
7,833,077 B1 * 11/2010 Simmons, Jr. ......... A63H 33/08
 446/127

* cited by examiner

CLAMP ASSEMBLY FOR HOLDING VEHICLE PARTS

CROSS-REFERENCE TO RELATED APPLICATIONS

The present application claims priority under 35 U.S.C. § 119 to Indian Patent Application No. 201741009297, filed Mar. 17, 2017, the disclosure of which is incorporated herein by reference in its entirety.

BACKGROUND

The present application relates to a clamp, and more particularly relates to an attachable and detachable clamp assembly for holding different vehicle components/parts.

Various types of clamp and clip assemblies have been employed to connect various vehicle body parts and accessories. Conventionally, the clamp assembly for holding different vehicle accessories is made of single component. If any holding feature damages, the whole assembly needs to be replaced. Also, such assemblies may not handle higher length accessories and a new clamp assembly design may require for holding the accessories with different diameters. Additionally, vibration that occurs due to pulsation of fluids passing through a piping held under the floor of the vehicle body may be transmitted to the clamp holding the piping, and then shifted to the vehicle body panel, and to a driver or passenger. Conventional pipe clamps often do not produce a solution for such vibratory loads and is not effective at all operating speeds or conditions. Hence, there is a need for an improved clamp assembly that is capable of being easily attachable and/or detachable to/from other clamp assembly for holding vehicle parts of various sizes and dimensions, as described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

In some embodiments, an improved clamp assembly is provided that is capable of being easily attachable and/or detachable to/from other clamp assembly for holding vehicle parts of various sizes and dimensions.

In some embodiments, an improved clamp assembly is provided that is adapted for simultaneously holding several structures of various sizes and dimensions.

In some embodiments, an improved clamp assembly is provided that significantly reduces pipe jump issue during vibration.

In one aspect, the clamp assembly includes a body part having a recess of different sizes for holding an elongated structure with different sizes and shapes. The clamp assembly further includes a horizontal spaced T-slot located on a first side surface of the body part at its top and a T-shaped protruding arm located on a second side surface of the body part at its top. A male locking section with an extended snap arm is located on the first side surface of the body part at its bottom and a female locking section with a stopper is located on the second side surface of the body part at its bottom. The T-shaped protruding arm is locked into the T-slot and simultaneously the male locking section is locked into the female locking section, such that the clamp assembly is detachably assembled with another clamp assembly.

The T-shaped protruding arm is positioned and locked with a T-slot of another clamp assembly by sliding the T-shaped arm into the T-slot and simultaneously the female locking section is locked with a male locking section of another clamp assembly in such a way that the snap arm bends and slides into the female locking section and retains its original position after reaching the stopper of the female locking section, which detachably assembles two different clamp assemblies together. The two different clamp assemblies are detached from each other by sliding the T-shaped protruding arm away from the T-slot and simultaneously by pushing a bottom side of the snap arm to bend and release the snap arm from the stopper of the female locking section.

The assembly further includes a lid connected to a top portion of the body part at its end and movable relative to the body part to lock the body part in a closed state of the lid and to reduce a pipe jump issue during vibration. The lid includes two half-hole slots located and spaced apart from each other, where the slots are respectively positioned to be mate with two projections located on the top portion of the body part so as to lock the body part in the closed state of the lid. The body part, the lid, the horizontal spaced T-slot, the T-shaped protruding arm, the male locking section and the female locking section are formed as a mould of plastic material. The body part is formed as a stud shape body part, an anchor shape body part, a box prong shape body part or a fir tree shape body part. The body part is also formed as a spacer to adjust a center distance of the clamp assembly.

BRIEF DESCRIPTION OF THE DRAWINGS

The disclosed embodiments may be better understood by referring to the figures, in which like reference numerals refer to identical or functionally-similar elements throughout the separate views, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

The claimed subject matter has been provided here with reference to one or more features or embodiments. Those skilled in the art will recognize and appreciate that, despite of the detailed nature of the exemplary embodiments provided here; changes and modifications may be applied to said embodiments without limiting or departing from the generally intended scope. These and various other adaptations and combinations of the embodiments provided here are within the scope of the disclosed subject matter as defined by the claims and their full set of equivalents. Like numbers refer to like elements throughout.

The present invention is a clamp assembly that is adapted for holding vehicle parts of various sizes and is capable of being easily attachable and/or detachable to/from other clamp assembly. The clamp assembly simultaneously holds several structures of various sizes and dimensions. The present invention is easily attachable and/or detachable to/from other clamp assembly to reduce assembly tag time and can withstand higher extraction force. This assembly significantly reduces pipe jump issue during vibration.

Figure 1:
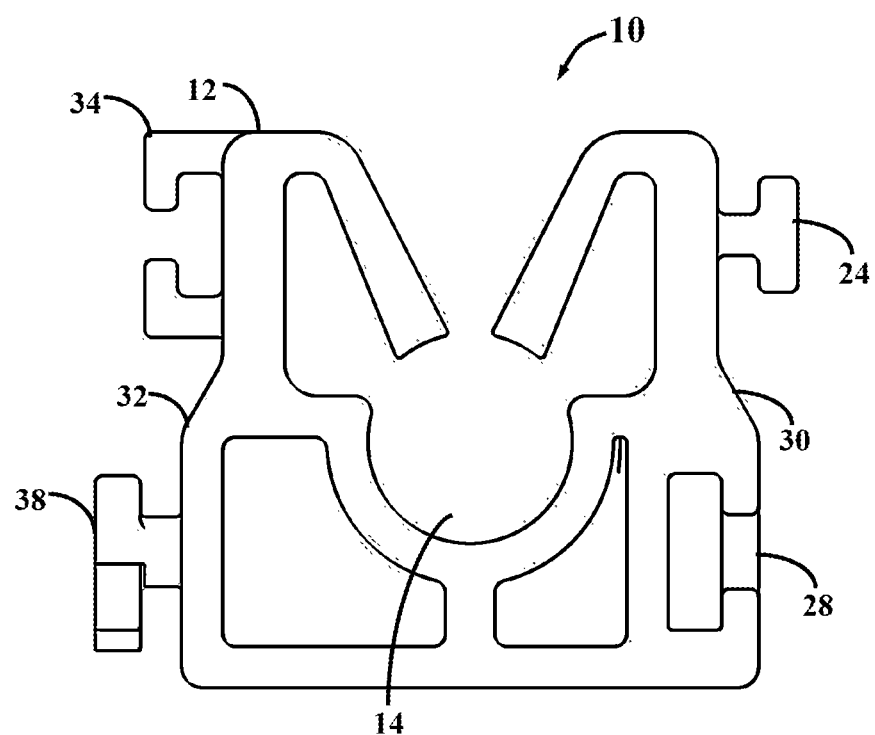
FIG. 1 illustrates a perspective view of a clamp assembly, in accordance with one embodiment.

Referring to FIG. 1 a perspective view of a clamp assembly (10) is illustrated, in accordance with the present invention. The clamp assembly (10) includes a body part (12) having a recess (14) of different sizes for holding an elongated structure (not shown) of different sizes and shapes. In a preferred embodiment, the elongated structure includes automobile components or parts, based on design consideration. Note that the embodiments discussed herein generally relate to the clamp assembly (10) for holding automobile components. It can be appreciated, however, that such embodiments can be implemented in the context of other systems and designs, and are not limited to the automotive field. The discussion of automobile systems, as utilized herein, is presented for general illustrative purposes only. In a preferred embodiment the elongated structure can be for example, a pipe. The term "pipe" refers not only to automotive exhaust pipes, but also to other tubular members of circular or other cross-sectional shape.

The clamp assembly (10) includes a horizontal spaced T-slot (34) located on a first side surface (32) of the body part (12) at its top and a T-shaped protruding arm (24) located on a second side surface (30) of the body part (12) at its top. The clamp assembly (10) further includes a male locking section (38) with an extended snap arm (16) located on the first side surface (32) of the body part (12) at its bottom and a female locking section (28) with a stopper (18) located on the second side surface (30) of the body part (12) at its bottom.

Figure 2:
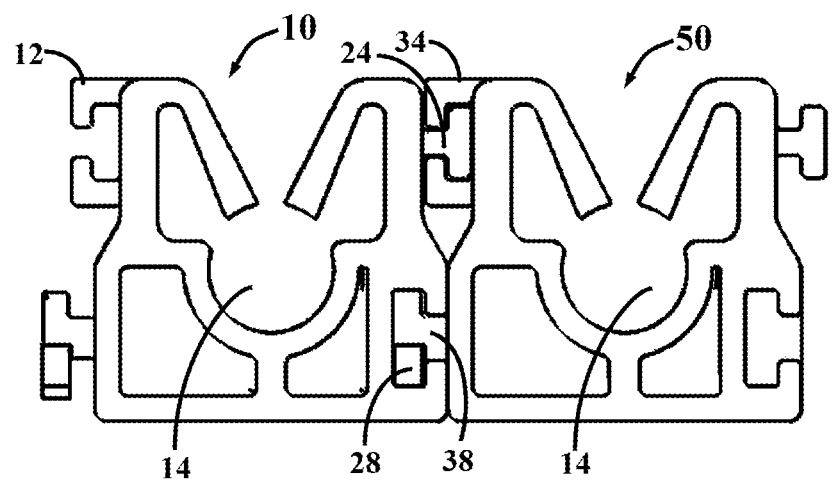
FIG. 2 illustrates a perspective view of the clamp assembly that is detachably assembled with another clamp assembly, in accordance with one embodiment.
Figure 3:
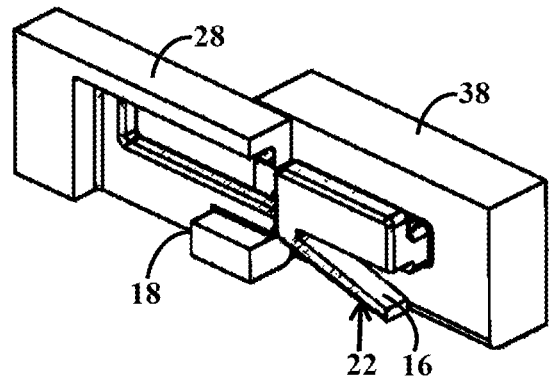
FIG. 3 illustrate a perspective view of a male locking section and a female locking section, in accordance with one embodiment.
Figure 4:
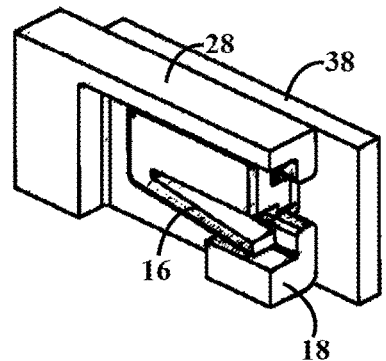
FIG. 4 illustrate another perspective view of the male locking section and the female locking section, in accordance with one embodiment.
Figure 5:
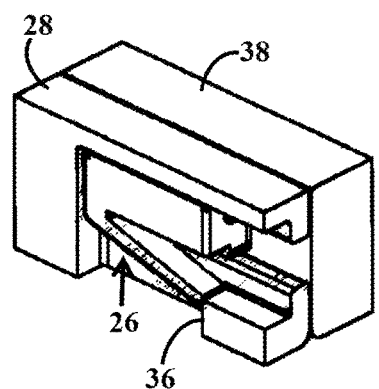
FIG. 5 illustrate another perspective view of the male locking section and the female locking section, in accordance with one embodiment.

Referring to FIG. 2 a perspective view of the clamp assembly (10) that is detachably assembled with another clamp assembly (50) is illustrated, in accordance with the present invention. Note that in FIGS. 1-12 identical parts or elements are generally indicated by identical reference numerals. The T-shaped protruding arm (24) is locked into the T-slot (34) and simultaneously the male locking section (38) is locked into the female locking section (28), such that the clamp assembly (10) is detachably assembled with another clamp assembly (50). The locking and unlocking process between the male locking section (38) and the female locking section (28), are illustrated in FIGS. 3-5. The male locking section (38) includes the extended snap arm (16) and the female locking section (28) includes the stopper (18) for locking and unlocking between the male locking section (38) and the female locking section (28) as shown in FIGS. 3-5.

The T-shaped protruding arm (24) is positioned and locked with a T-slot (34) of another clamp assembly (50) by sliding the T-shaped arm (24) into the T-slot (34). Simultaneously, the female locking section (28) is locked with a male locking arm (38) of another clamp assembly (50) in such a way that the snap arm (16) bends and slides into the female locking section (28) as shown by arrow (22) and retains its original position after reaching the stopper (18) of the female locking section, which detachably assembles two different clamp assemblies (10) and (50) together.

Figure 6:
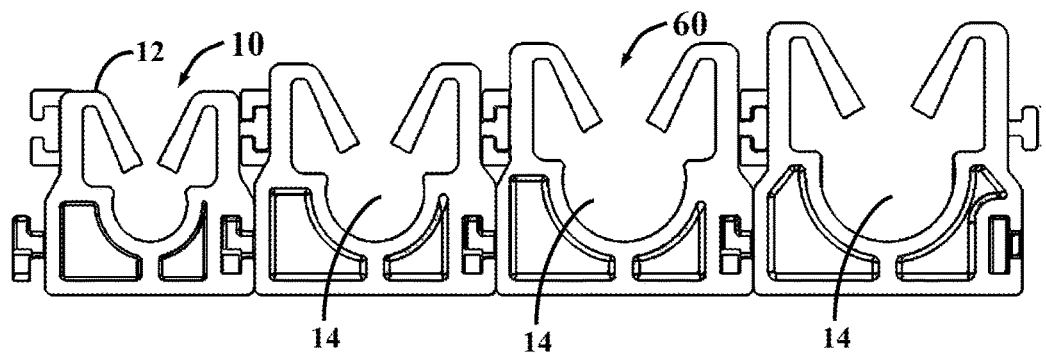
FIG. 6 illustrates a perspective view of the clamp assembly that is attached to other clamp assemblies for holding vehicle parts of various sizes and dimensions, in accordance with one embodiment.

Similarly, the two different clamp assemblies (10) and (50) are detached from each other by sliding the T-shaped protruding arm (24) away from the T-slot (34) and simultaneously by pushing a bottom side (26) of the snap arm (16) to bend and release the snap arm (16) from the stopper (18) of the female locking section (28), as shown in FIG. 5. The clamp assembly (10) is attached to other clamp assemblies (60) for holding vehicle parts of various sizes and dimensions, as shown in FIG. 6. The clamp assemblies (60) include the body part (12) having the recess (14) of different diameter for holding the elongated structure of different sizes and shapes. The clamp assembly (10) attached to other clamp assemblies (60) simultaneously holds several tubular structures of various sizes and dimensions.

Figure 7:
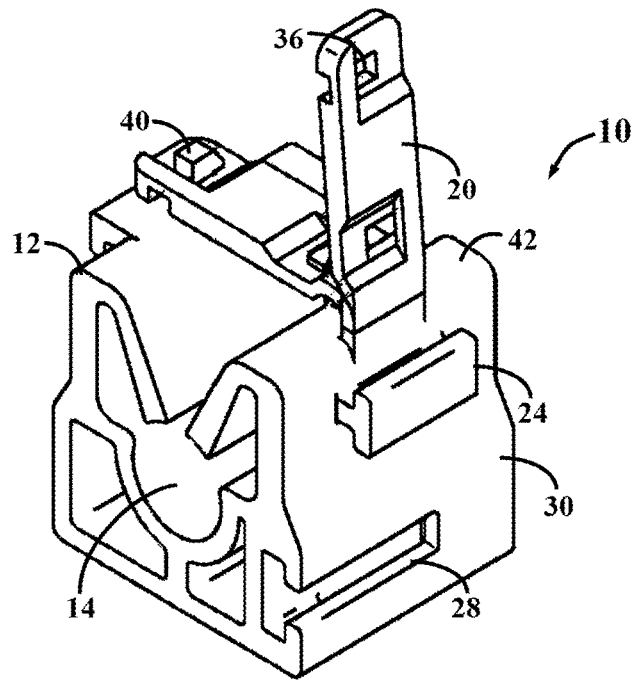
FIG. 7 illustrates a perspective view of a clamp assembly having a lid, in accordance with one embodiment.
Figure 8:
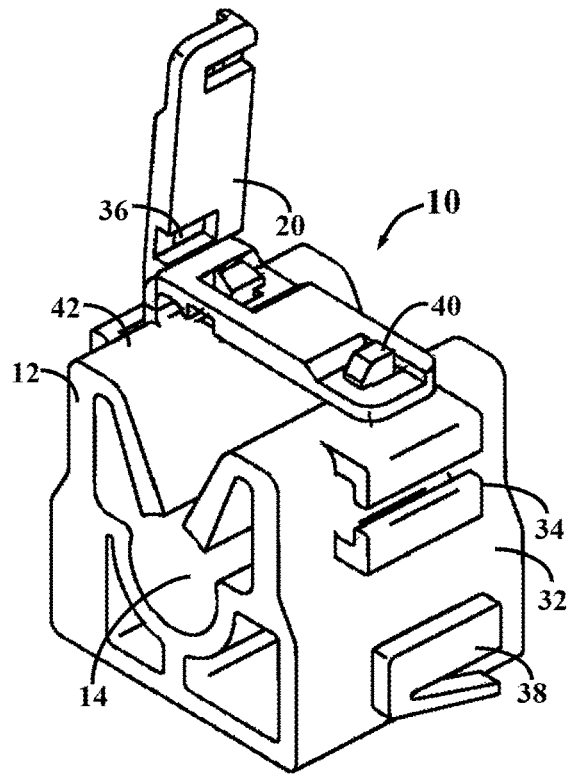
FIG. 8 illustrates another perspective view of the clamp assembly having the lid, in accordance with one embodiment.

FIGS. 7-8 illustrate a perspective view of the clamp assembly (10) having a lid (20), in accordance with the present invention. The lid (20) is connected to a top portion (42) of the body part (12) at its end and movable relative to the body part (12) to lock the body part (12) in a closed state of the lid (20). The lid (20) comprises two half-hole slots (36) located and spaced apart from each other, where the slots (36) are respectively positioned to be mate with two projections (40) located on the top portion (42) of the body part (12) so as to lock the body part (12) in the closed state of the lid (20). In a preferred embodiment, the body part (12), the lid (20), the horizontal spaced T-slot (34), the T-shaped protruding arm (24), the male locking section (38) and the female locking section (28) are formed as a mould of plastic material, depending upon design consideration.

Figure 9:
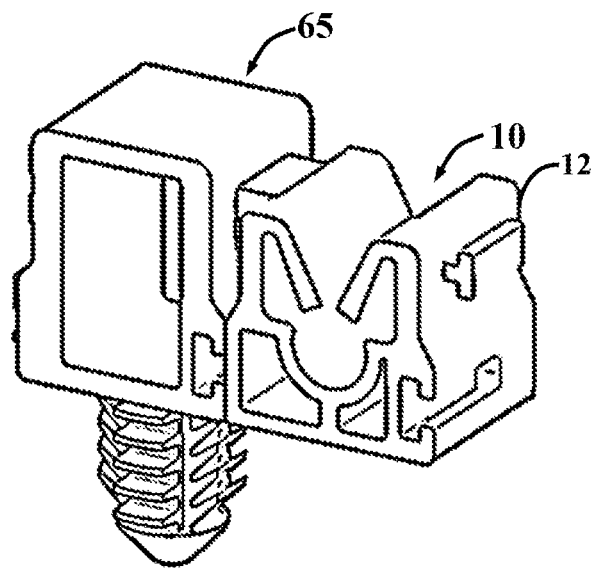
FIG. 9 illustrates a perspective view of the clamp assembly with the body part attached to a fir tree shape body part, in accordance with one embodiment.
Figure 10:
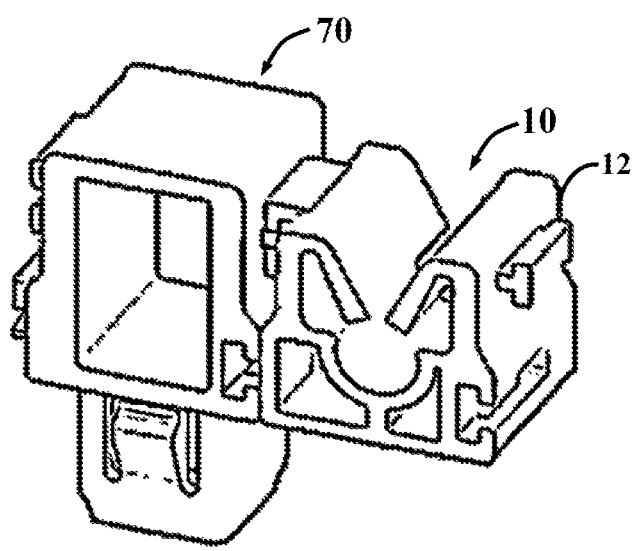
FIG. 10 illustrates a perspective view of the clamp assembly with the body part attached to an anchor shape body part, in accordance with one embodiment.
Figure 11:
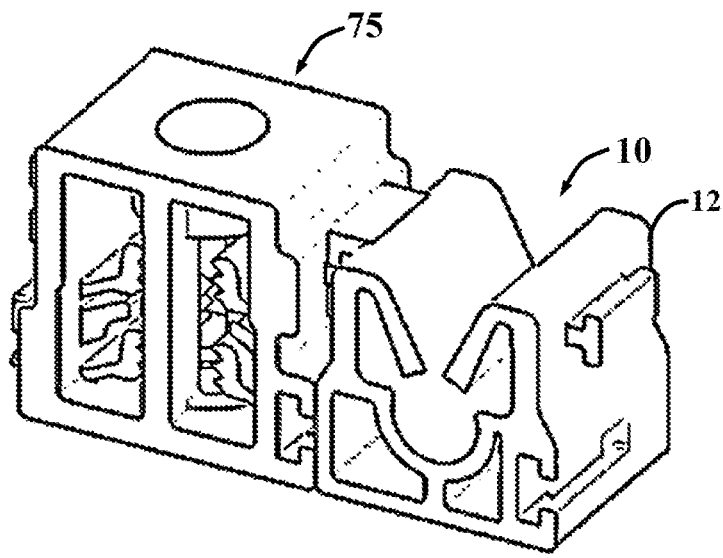
FIG. 11 illustrates a perspective view of the clamp assembly with the body part attached with a stud shape body part, in accordance with one embodiment.
Figure 12:
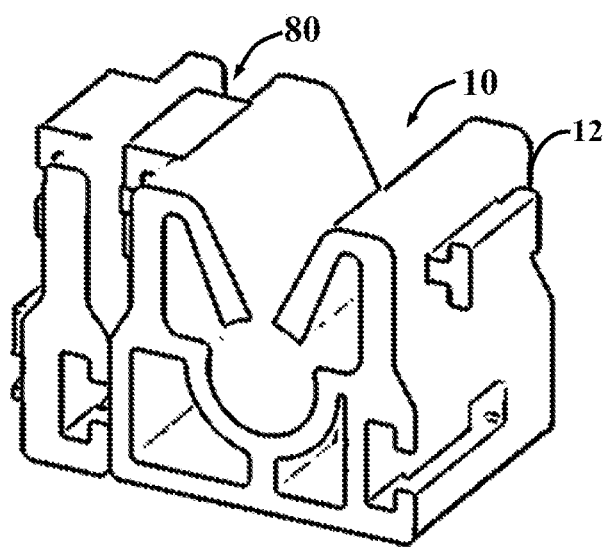
FIG. 12 illustrates a perspective view of the clamp assembly with the body part attached to a spacer to adjust a center distance of the clamp assembly, in accordance with one embodiment.

The clamp assembly (10) with the body part (12) is also attached to a fir tree shape body part (65), a box prong shape body part (70), a stud shape body part (75) and an anchor shape body part (not shown), as shown in FIGS. 9-11. The clamp assembly (10) with the body part (12) is also attached to a spacer (80) to adjust a center distance of the clamp assembly (10), as shown in FIG. 12. The T-shaped protruding aim (24) is locked into the T-slot (34) and simultaneously the male locking section (38) is locked into the female locking section (28), such that the clamp assembly (10) is detachably assembled with fir tree shape body part (65), the box prong shape body part (70), the stud shape body part (75), the spacer (80) and the anchor shape body part. The clamp assembly (10) affords ease of assembly/disassembly and provides significant cost savings without replacing the whole assembly if any holding feature damages, in addition to ease of serviceability. The clamp assembly (10) also holds higher length accessories with different diameters.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

We claim:

1. A clamp assembly, comprising:
a body part having a recess of different sizes for holding an elongated structure with different sizes and shapes;
a horizontal spaced T-slot located on a first side surface of the body part at its top and a T-shaped protruding arm located on a second side surface of the body part at its top; and
a male locking section with an extended snap arm located on the first side surface of the body part at its bottom and a female locking section with a stopper located on the second side surface of the body part at its bottom,
wherein the T-shaped protruding arm is locked into the T-slot and simultaneously the male locking section is locked into the female locking section, such that the clamp assembly is detachably assembled with another clamp assembly.

2. The assembly of claim 1, further comprising a lid connected to a top portion of the body part at its end and movable relative to the body part to lock the body part in a closed state of the lid.

3. The assembly of claim 2, wherein the lid comprises two half-hole slots located and spaced apart from each other, where the slots are respectively positioned to be mate with two projections located on the top portion of the body part so as to lock the body part in the closed state of the lid.

4. The assembly of claim 1, wherein the T-shaped protruding arm is positioned and locked with a T-slot of another clamp assembly by sliding the T-shaped protruding arm into the T-slot of the other clamp assembly and simultaneously the female locking section is locked with a male locking section of another clamp assembly in such a way that the snap arm bends and slides into the female locking section and retains its original position of the snap arm after reaching the stopper of the female locking section, which detachably assembles two different clamp assemblies together.

5. The assembly of claim 4, wherein the two different clamp assemblies are detached from each other by sliding the T-shaped protruding arm away from the T-slot and simultaneously by pushing a bottom side of the snap arm to bend and release the snap arm from the stopper of the female locking section.

6. The assembly of claim 1, wherein the body part, the lid, the horizontal spaced T-slot, the T-shaped protruding arm, the male locking section and the female locking section are formed as a mould of plastic material.

7. The assembly of claim 1, wherein the body part is formed as a fir tree shape body part, a box prong shape body part, a stud shape body part, or an anchor shape body part.

8. The assembly of claim 1, wherein the body part is formed as a spacer to adjust a center distance of the clamp assembly.

* * * * *